Dec. 28, 1965 W. H. BARKOW ETAL 3,226,588

ELECTROMAGNETIC DEFLECTION YOKE

Filed July 9, 1962 3 Sheets-Sheet 1

INVENTORS
WILLIAM H. BARKOW &
BY CLIFFORD C. MATTHEWS

W. H. Sprague
ATTORNEY

INVENTORS
WILLIAM H. BARKOW &
BY CLIFFORD C. MATTHEWS

W. H. Sprouagle
ATTORNEY

ELECTROMAGNETIC DEFLECTION YOKE

Filed July 9, 1962 3 Sheets-Sheet 3

INVENTORS
WILLIAM H. BARKOW &
BY CLIFFORD C. MATTHEWS

W. H. Sprouagle
ATTORNEY 3,226,588
ELECTROMAGNETIC DEFLECTION YOKE
William H. Barkow, Pennsauken, and Clifford C. Matthews, Merchantville, N.J., assignors to Radio Corporation of America, a corporation of Delaware
Filed July 9, 1962, Ser. No. 208,356
5 Claims. (Cl. 313—76)

This invention relates to electromagnetic deflection yokes for the deflection of the electron beam or beams of cathode ray tubes used to reproduce images in a television receiver.

The use of image reproducing cathode ray tubes in the commercial television receiver field that require increasingly greater deflection angles has made it difficult to design and manufacture electromagnetic deflection yokes that will properly deflect the electron beam or beams of these tubes to provide a commercially acceptable television roster on their image reproducing screens. An electromagnetic deflection yoke is normally constructed of two pairs of coil windings, one pair providing vertical electron beam deflection and the other pair providing horizontal electron beam deflection. Cathode ray tubes requiring wide-angle electron beam deflection, particularly the shadow mask color television image reproducing cathode ray tubes using three electron beams, need a relatively exact flux pattern distribution from both the horizontal and vertical coil windings to insure correct raster scanning and convergence of the rasters produced by the three electron beams.

In the shadow mask type of color image reproducing cathode ray tube, three electron beams from three separate electron guns are used. The phosphor image reproducing screen of the tube is an array of phosphor dots; approximately one-third of which emit red light when struck by electrons, a third emit blue light, and the remaining third emit green light. A trio of dots is made up of a red phosphor dot, a blue phosphor dot, and a green phosphor dot. A metallic shadow mask is positioned near the array of phosphor dots, and has an aperture associated with each trio of dots. The particular dot of any trio which is excited by electrons passing through the apertures is determined by the angle at which the electrons pass through the shadow mask.

Present commercially available color television receivers using the shadow mask tube use deflection angles of approximately 70°, and special convergence circuitry associated with the tube is provided to insure that the electron beams are properly converged, that is, so that they strike the shadow mask at the same point to cause light emission from the correct phosphor dots. An increase in deflection angle to 90°, or greater, magnifies the problem of converging the electron beams and minor deflection errors, which may be unnoticeable at 70° deflection, may become quite objectionable at 90° deflection.

In accordance with the invention, an electromagnetic deflection yoke for a color image reproducing cathode ray tube in a television receiver comprises a pair of deflection coil windings to provide vertical deflection of the electron beams of the tube, and a second pair of coil windings to provide horizontal deflection of the beams. The winding distribution of the coil windings is varied axially along the length of the yoke to provide a properly shaped flux pattern distribution to control the deflection errors of the yoke so that the electron beams of the tube may be properly converged on the screen of the tube.

This invention may be better understood however when the following detailed description is read in connection with the following drawings, in which.

Figures 1, 2:
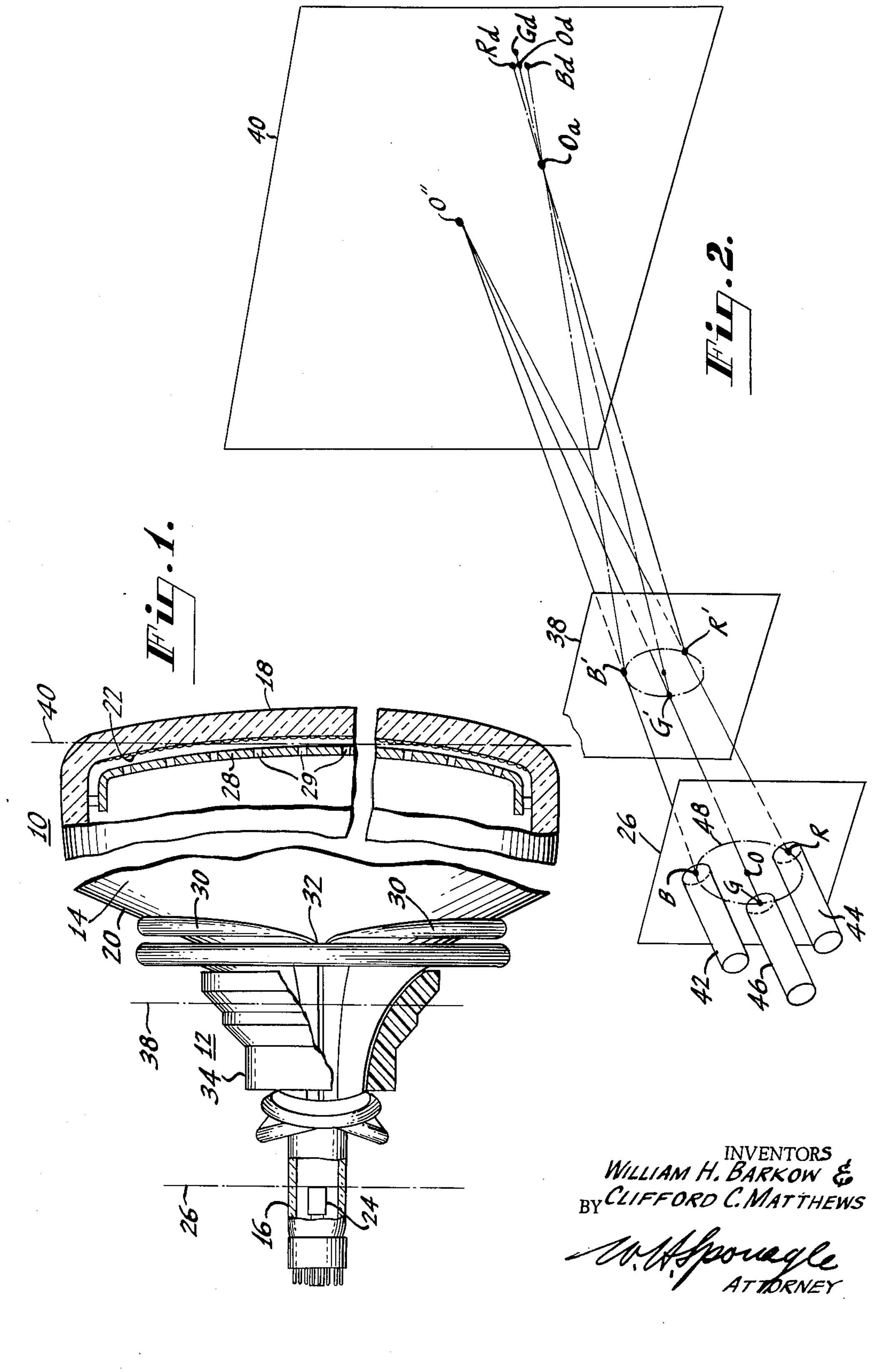
FIGURE 1 is a drawing, partly broken away and partly in section of a shadow mask tube and deflection yoke.
FIGURE 2 is an electron beam path diagram for the shadow mask tube of FIGURE 1.

FIGURE 1 shows a shadow mask color image reproducing cathode ray tube 10 and an electromagnetic reflection yoke 12 associated therewith. The tube 10 and yoke 12 are shown partly broken away and partly in section to more clearly illustrate the relationship of the components. The shadow mask tube 10 includes an envelope 14 having a generally cylindrical neck 16, a curved face plate 18, and a funnel 20, interposed between the neck 16 and the face plate 18. An array of phosphor dots 22 covers the inner surface of the face plate 18. The phosphor dots 22 are arranged in trios, such that each trio contains a red light emitting phosphor dot, a green light emitting phosphor dot, and a blue light emitting phosphor dot. An electron gun assembly 24 is positioned in the neck 16 of the tube to project three electron beams through the neck 16 and funnel 20 toward the array of phosphor dots 22. The electron beams are emitted from a transverse, or gun plane 26, on which the end of the electron gun assembly 24 lies, as will be more fully explained in connection with FIGURE 2. A shadow mask 28 is positioned near the face plate 18 between the electron gun assembly 24 and the array of phosphor dots 22. The shadow mask 28 is a metallic plate having a series of apertures 29, with each aperture associated with a separate trio of phosphor dots. Electron beams from the electron gun assembly 24 passing through the apertures 29 strike one of the trio of phosphor dots associated therewith. The particular phosphor dot struck by a given electron beam is determined by the angle at which the electron beam passes through the shadow mask 28.

The yoke 12 includes a pair of horizontal deflection coil windings 30 which are of the saddle wound type (see Patent No. 2,901,665, issued on August 25. 1959, to W. H. Barkow et al., and entitled "Cathode Ray Tube Deflection Yoke"), and a similar pair of vertical deflection coil windings 32 (only one of which may be seen in FIGURE 1) surrounded by a core 34.

In order to secure horizontal deflection of the electron beams, a time varying magnetic field is provided through the neck 16 and funnel 20 of tube 10 that is generally vertical in direction and varies in magnitude and polarity with time. This magnetic field is generated by driving a time varying electric current through the horizontal winding 30. Although the actual deflection of the electron beams takes place throughout the entire field produced by the windings 30, the effective center of deflection may be considered, at least for the purposes of this description, as in a transverse deflection plane 38 located near the longitudinal center of the coil windings 30. In a similar manner, vertical deflection is effected by a time varying magnetic field, which is generally horizontal, produced by the vertical windings 32.

After deflection by the magnetic field of the yoke 12, the electron beams continue in substantially straight paths to strike the shadow mask 28 and the array of phosphor dots 22. The shadow mask 28 and the face plate 18 carry the array of phosphor dots 22 are slightly curved, but for descriptive purposes, the electron beams may be considered to strike a transverse screen plane 40, shown in FIGURE 1 as touching the face plate side of the shadow mask 28.

FIGURE 2 is a beam path diagram of the tube 10 of FIGURE 1 in which three electron guns 42, 44, 46 of the electron gun assembly 24 (of FIGURE 1) are arranged such that the point from which each gun emits its electrons is in the gun plane 26. The point from which electrons are emitted by the first gun 42 is labeled point B on the gun plane 26; from the second gun 46, point G; and from the third gun 44, point R. Electrons from the first gun 42 (point B) excite the blue phosphor dots of the array 22; those from the second gun 46 (point G) excite the green phosphor dots; and those from the third gun 44 (point R) excite the red phosphor dots. The points B, R and G lie on a circle 48 on the gun plane 26 which has the point O as its center, and the points B, G and R are spaced at 120° of an arc around the circle 48, to form an equilateral triangle with the point B at the apex. Electrons which are emitted from the gun plane 26 toward the screen plane 40 pass through the deflection plane 38, at the points B′, R′ and G′ corresponding respectively to the points B, R and G on the gun plane 26. If no deflection field is present, all of the beams strike the screen plane 40 at the point O″, and the beam paths B–O″; R–O″; and G–O″ are thus the undeflected beam paths of the tube 10. It will be noticed that the three beam paths B–O″; R–O″; and G–O″ strike the screen plane 40 at different angles. Thus, the electron beams pass through the shadow mask 28 of FIGURE 1 at different angles, each striking different dots of the phosphor dot trios.

As the electron beams are deflected away from the central position, under ideal deflection by a uniform magnetic field, their deflected beam paths no longer converge on the screen plane 40. This is shown on FIGURE 2 for a horizontal deflection of the beams to form deflected beam paths B–$B_d$, G–$G_d$, and R–$R_d$. The deflected beam paths do not converge at point $O_d$ on the screen plane 40 ($O_d$ being the deflected position of the center of the beams) but rather converge at a point $O_a$ between the screen plane 40 and the deflection plane 38. In present commercial color television receivers using the shadow mask tube, convergence circuits, which apply auxiliary dynamic magnetic fields in the paths of the electron beams, cause the beams to converge on the screen plane 40, so that, for instance, the deflected beam paths B–$B_d$, G–$G_d$, and R–$R_d$, shown on FIGURE 2, converge at point $O_d$. (See Patent No. 2,707,248, issued to H. C. Goodrich, on April 26, 1955, and entitled "Electromagnetic Beam-Convergence System for Tri-Color Kinescopes.")

Figure 4:
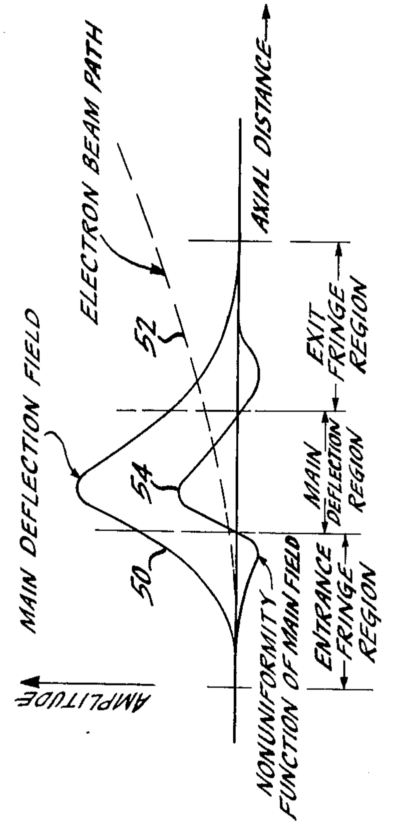
FIGURE 4 is a graph showing curves illustrating certain flux distribution patterns of the yoke of FIGURE 1.
Figure 3:
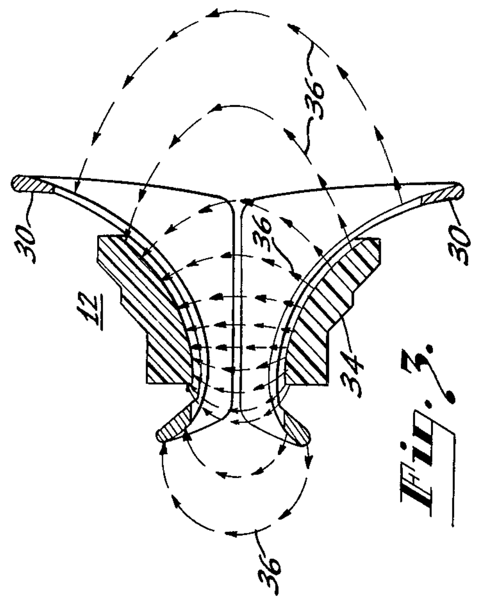
FIGURE 3 is a sectional view of the yoke of FIGURE 1 illustrating longitudinal flux distribution patterns.

The magnetic deflection field provided by an electromagnetic yoke 12, however, is not a uniform magnetic field. FIGURE 3 shows a longitudinal section of the horizontal windings 30 and core 34 of the yoke 12 of FIGURE 1 and the heavy dashed lines 36 show typical magnetic flux paths that are found between the windings 30 to illustrate the departure of the magnetic field from uniformity along the longitudinal axis of the yoke 12. FIGURE 3 particularly illustrates that the field is highly curved at the rear (small end) and front (large end) of the yoke 12. The distribution of the flux along the longitudinal axis of the yoke 12 is shown graphically in FIGURE 4 as curve 50, labeled "Main Deflection Field." The amplitude of the "Main Deflection Field" generally rises from minimum at the "Entrance Fringe Region" (rear) of the yoke 12 to a peak in the "Main Deflection Region," and then gradually diminishes at the "Exit Fringe Region" (front). The deflection of the electron beam as it traverses the yoke 12 is shown by the electron beam path curve 52. The absolute magnitude of the "Main Deflection Field" 50 varies with the strength of the current conducted through the windings 30, but its shape remains the same and does not change with the amount of deflection current. The amount of deflection of the electron beam path 52 varies with the strength of the deflection field.

Figure 6:
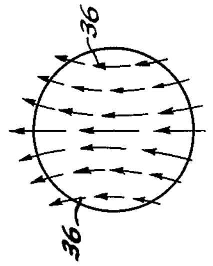
FIGURES 5 and 6 are diagrams illustrating transverse flux distribution patterns of the yoke shown in FIGURE 1.
Figure 5:
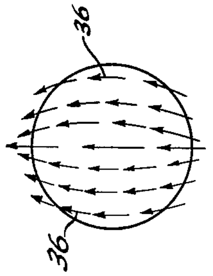

Other types of non-linearities exist in the field of the yoke 12 and are illustrated in FIGURES 5 and 6, which show flux path lines 36 on a transverse plane through the yoke 12. FIGURE 5 shows "barrel" distortion, that is, the flux lines 36 are concave toward the center of the field; and FIGURE 6 shows "pincushion" distortion, that is, the flux lines 36 are convex toward the center of the field. The type of non-linearities (barrel or pincushion) that exists in transverse planes along the longitudinal axis are plotted as curve 54 in FIGURE 4, labeled "Nonuniformity Function of Main Field." Points on the curve 54 above the horizontal reference line indicate that the transverse flux distribution is pincushioned in a transverse plane cutting the yoke field at this point. Points on the curve 54 below the reference line indicate a barreled field. The distance away from the reference line indicates the amount of barrelling or pincushioning.

The non-linearities in the magnetic field produced by the yoke 12 produce two main types of distortions of the image displayed on the array of dots 22 covering the face plate 18 (FIGURE 1). The first of these distortions is a raster distortion. Raster distortion exists when the raster, instead of being rectangular, has its outer edges curved. Raster distortion may be corrected by known techniques, such as described in Patent 2,649,555, issued on August 18, 1963 to R. K. Lockhart, and entitled "Television Raster Shape Control System."

The second type of distortion produced by the nonlinearity of the magnetic field of the yoke 12 may be called spot distortion. Spot distortion in black and white, single electron beam, image reproducing tubes is a deformation of the shape of the electron beam so that the light spot produced by the electron beam when it strikes the phosphor light emitting surface is not circular, but is distorted into an ellipse or some other more complex shape. Spot distortion in a three beam shadow mask tube has an added complication in that the three electron beams must be considered to be three rays of a much larger effective single beam having the size of the circle defined by the three electron guns in the gun plane 26 as shown in FIGURE 2. Ideally, the three rays of the effective single beam are converged on the shadow mask 28. Spot distortion exists when the effective single beam is distorted into elliptical or more complicated shapes, as it strikes the shadow mask 28. This invention is directed to minimizing such spot distortions.

Coma is a type of spot distortion produced by the barrelling and pincushioning of the magnetic field of the yoke 12 in transverse planes. The electron beams originate with the blue (B) beam uppermost at the apex of an equilateral triangle centrally positioned in the horizontal direction between the green (G) beam on the lower right corner of the triangle and the red (R) beam on the lower left corner of the triangle (as viewed from the screen plane 40 of FIGURE 2). If the beams traverse an entire yoke field that is predominately either barrelled or pincushioned, the relative landing positions of the beams on the screen plane 40 of FIGURE 2 are rotated from their beginning positions at the gun plane 26, around the circle defined by the three beams. Severe coma distortion could place the green (G) or red (R)

beams uppermost instead of the blue (B) beam. If, however, the total barrelling along the longitudinal axis of the yoke axis just cancels the total pincushioning along the axis, no coma distortion results. Another way of defining the same thing is to say that if the area under the curve 54 of FIGURE 4 above the reference line equals the area under the curve 54 below the reference line, no coma distortion results.

The barrelled and pincushioned traverse non-linearities of the magnetic field of the yoke 12, together with the non-linearity of the field along its longitudinal axis, produce other spot distortions which may be broadly called astigmatism. Astigmatism results because of the geometry of the yoke 12 and tube 14 and because of the specific distortions that exist in the field at any point in the field through which the electrons must travel. For instance, the points of convergence of an undeflected and deflected beam shown as points O″ and $O_a$ on FIGURE 2 do not lie on a spherical surface, but all such points $O_a$ under simultaneous vertical and horizontal deflection, define a complicated curved surface. In addition, it is apparent that the beams, when deflected from their undeflected positions, travel different length paths to reach the screen plane 40, so that the circular configuration of the effective single beam (of which the three electron beams are rays) as it passes through the deflection plane 38 forms an ellipse when the beams reach the screen plane 40. Astigmatism, unlike coma, is proportional to the product of the amount of nonuniformity in the field (as shown by the curve 54 in FIGURE 4) and the deflection of the beams. Thus, the non-linearity of the field at the exit fringe of the yoke has a greater effect on astigmatism than the non-uniformities of the field in the "Main Deflection Region" and the "Entrance Fringe Region" of the yoke 12.

Figure 7:
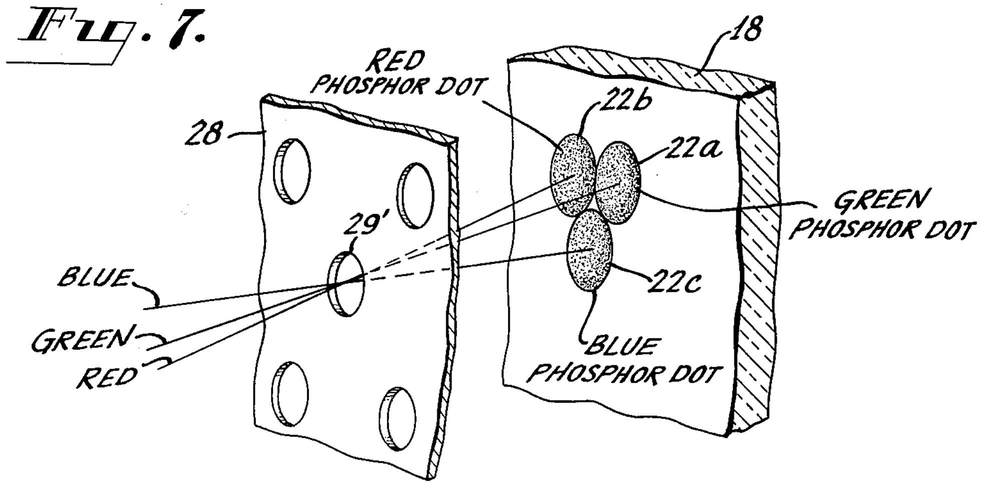
FIGURE 7 is a perspective view of a portion of the shadow mask tube shown in FIGURE 1.

FIGURE 7 shows a portion of the shadow mask 28 and the face plate 18 of the tube shown in FIGURE 1. The central aperture 29′ shown in FIGURE 7 is associated with a trio of phosphor dots, viz., a green phosphor dot 22A, a red phosphor dot 22B and a blue phosphor dot 22C. Three electron beam paths labeled blue, red and green are shown traversing the aperture and striking the proper phosphor dots; that is the green beam path strikes the green phosphor dot 22A, the red beam path the red phosphor dot 22B, and the blue beam path the blue phosphor dot 22C. The paths shown in FIGURE 7 do not represent the entire diameter of the electron beams as they reach the shadow mask 28; the electron beams are sufficiently large in cross-sectional area to penetrate several apertures 29′ at the same time. If the entire beam diameter were illustrated in FIGURE 7, all rays of the beams would have paths similar to the single paths shown; and the beams would pass through the other apertures in the shadow mask 28 in approximately the directions shown.

FIGURE 7 shows the desired landing positions of the three electron beams on the shadow mask 28, that is, when all three beams are properly converged on the shadow mask and each electron beam is striking the correct phosphor dot. The effect of any beam misconvergence is to shift the landing positions of the three beams to different points on the shadow mask as much as one-half inch or more apart, in severe cases. In addition, spot distortions move the landing positions of the beams in different directions and by varying amounts on different parts of the shadow mask. This makes it difficult, at best, to converge the beams by the use of external convergence circuits.

While it is impractical and uneconomical to attempt to design and build deflection yokes for home color television receivers that do not have any of the spot distortions that have been described, it has been found possible to reduce the distortions so that convergence circuits, similar to those presently used with the 70° shadow mask color television receivers, may be used to provide satisfactory electron beam convergence and color image reproduction from a wide-angle, shadow mask tube.

Figures 8, 10:
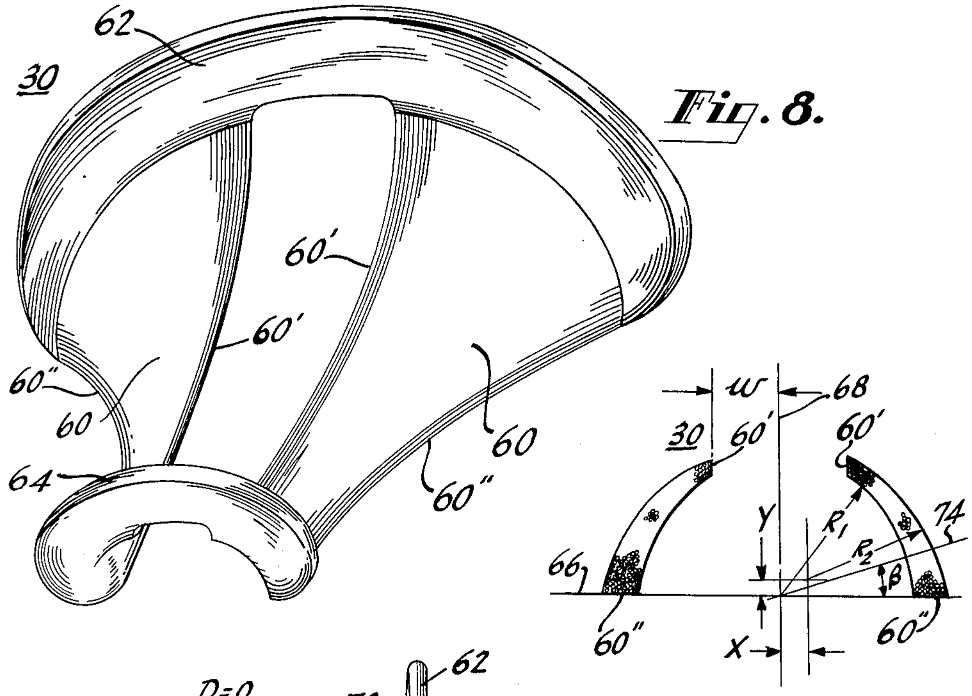
FIGURE 8 is a perspective view of one of a pair of horizontal deflection windings illustrating the invention.
FIGURE 10 is a partial cross section of the winding of FIGURES 8 and 9 showing the wire distribution of the winding.
Figure 9:
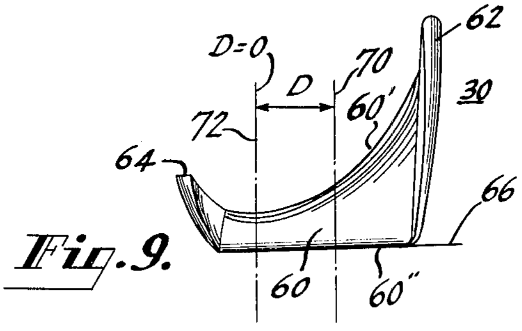
FIGURE 9 is a side view of the winding of FIGURE 8.

FIGURES 8, 9 and 10 show perspective, side and cross-sectional views of a single horizontal yoke winding 30 (one of the pair of horizontal windings 30 shown in FIGURE 1) embodying the invention, which includes active conductors 60 that lie along the outer surface of the tube 10, front end turns 62, and rear end turns 64. The active conductors have inner edges 60′ and outer edges 60″. A window area is defined between the inner edges 60′ of the active conductors 60 and the front and rear end turns 62 and 64. The winding is generally shaped to fit over the junction of the neck 16 and funnel 20 of the tube 10 as shown in FIGURE 1. The winding 30 is wound with single or multifilar wire on automatic winding machines and formed to exact shape in molding machines. The winding distribution of the wire making up the winding 30, and hence the distribution of the magnetic flux produced by it, is determined by the variations in thickness of active conductor volume along the length of the winding, and by variation in thickness circumferentially about the active conductor volume from the inner edge 60′ to the outer edge 60″.

The manner of determining the wire distribution of the active conductors is shown in FIGURE 10, which is a cross-section of a single yoke winding 30 taken in a vertical plane perpendicular to the longitudinal axis of the winding 30 indicated by the line 70 in FIGURE 9.

Because two horizontal coils 30 are used in a yoke with their outer edges 60″ contiguous, the horizontal axis of the yoke is a line formed by the intersection of a horizontal plane 66 determined by the outer edges 60″ of the winding 30 and a central vertical plane 68 perpendicular to the horizontal plane 66 and equidistant from the outer edges 60″ of the winding 30, as shown in FIGURE 10.

The plane 70 is spaced a distance D from and parallel to a reference plane 72 which is a transverse plane passing through the yoke winding at the longitudinal position along the yoke at which the flare begins, that is, at the point at which the inner surface of the winding 30 begins to depart from the cylindrical. Between the reference plane 72 and the rear end turns 64, the inner surface of the winding 30 is cylindrical and constant in radius. Between the reference plane 72 and the front end turns 62, however, the inner radius of the yoke increases in value with the distance D along the longitudinal dimension of the winding to fit the shape of the tube 10 of FIGURE 1.

It has been found that, in order to make the most practical compromise between coma and astigmatism, the transverse field in the "Exit Fringe Region" or front of the yoke 12 should be more barrelled than is normally present in wide angle yokes. The barrelled field at the front of the yoke provides the best compromise thus far found between astigmatism caused by the geometry of the yoke 12 and tube 10 combination and astigmatism caused by the nonuniformity of the magnetic field.

In most present commercially available wide angle yokes the winding distribution between the inner and outer edges 60′ and 60″ of the active conductors 60 remains constant from the reference plane 72 to the front of the winding at the front end turns 62, that is, the number of winding turns subtended between the horizontal plane 66 and an oblique plane 74 passing through the longitudinal axis of the winding and at an angle $\beta$ (see FIGURE 10) to the horizontal plane 66 of FIGURE 10 is the same at any point along the longitudinal axis of the winding. In order to provide the barrelled field at the "Exit Fringe Region" or flare, the winding distribution is varied between the inner edge 60′ and the outer edge 60″ of the active conductors 60 along the longitudinal dimension of the yoke by shifting turns away from outer edge 60″ toward the inner edge 60′. Thus, the oblique plane 74 passing at the angle $\beta$ to the horizontal plane 66 of FIGURE 10 through the longitudinal axis of the winding will subtend, between the oblique plane 74 and the horizontal plane 66, a greater percentage of the turns near the rear of the winding 30 that it will at the front of the winding. This may also be described as shifting the turns distribution of the winding toward the window area progressively from rear to front along the axis of the winding. Since most of the correction is to take place in the front of the yoke 12 at the "Exit Fringe Region" the greatest change in distribution occurs near the front of the winding 30.

In order to vary the winding distribution in the proper manner to reduce the coma and astigmatism to amounts that may be correctable by known convergence circuits, the dimensions of the winding at any transverse plane 70, a distance D from the reference plane 72, are specified by (1) a radius $R_1$ of a circle defining the inner surface of the active conductors 60, which has its center on the central vertical plane 68 passing vertically through the longitudinal axis of the winding, and (2) a radius $R_2$ of a circle, defining the outer surface of the active conductors 60, whose center is spaced away from the longitudinal axis of the winding by a distance X in the horizontal direction and by a distance Y in the vertical direction. The proper distribution of the winding is obtained by reducing the dimensions of X and Y as the distance D from the reference plane 72 increases toward the front of the winding. By this means the winding begins at the reference plane 72 as one in which the distribution is greatest near the outer edge 60'' of the winding and minimum near the window or inner edge 60'', and progressively becomes more uniform in distribution from inner edge 60' to outer edge 60'' toward the front end of the winding as the turns are shifted toward the window area.

It will be appreciated that, since the yoke windings for television receivers are wound on automatic winding machines and formed under heat and pressure in molding machines, a complete reversal of the distribution between front and rear (that is, a change of distribution from a concentrated outer edge at the rear to a concentrated inner edge at the front) is not feasible on a mass production basis.

Values for the dimensions $R_1$, $R_2$, X and Y at one-quarter inch intervals of D are given below as typical examples of a single horizontal winding configuration that may be used with a 90° shadow mask tube.

| D, inches | $R_1$, inches | $R_2$, inches | X, inches | Y, inches |
|---|---|---|---|---|
| .25 | .831 | .843 | .098 | .029 |
| .5 | .928 | .943 | .083 | .029 |
| .75 | 1.056 | 1.071 | .070 | .028 |
| 1.00 | 1.213 | 1.229 | .056 | .026 |
| 1.25 | 1.399 | 1.418 | .043 | .024 |
| 1.50 | 1.615 | 1.640 | .030 | .020 |
| 1.75 | 1.863 | 1.896 | .016 | .014 |
| 2.00 | 2.145 | 2.191 | .003 | .003 |
| 2.05 | 2.206 | 2.254 | 0 | 0 |

The distance W shown on FIGURE 10, is the spacing of the inner edge 60' of the active conductors 60 from the central vertical plane 68 of the winding 30. The angle subtended by the window area to the central longitudinal axis of the yoke thus decreases at the front of the yoke to aid in providing a more uniform distribution of the field, thereby reducing higher order distortions in the field caused by the fact that there are no active conductors across the window area. Similar winding distribution is provided for the vertical winding 32 of FIGURE 1.

It will be appreciated that the manner of correcting the yoke windings for coma and astigmatism by varying the distribution of the winding along its longitudinal dimension may be used to correct other distortions that may arise in a particular application, such as, raster distortion in black and white cathode ray tubes. Or a reverse distribution, that is, changing the distribution toward uniform at the rear of the winding, may be desired for other reasons in types of color image reproducers other than the shadow mask tube.

What is claimed is:

1. An electromagnetic deflection yoke for a cathode ray tube, said tube having a generally cylindrically neck portion and a flared bulb portion, comprising in combination:

a plurality of pairs of coil windings disposed about a central longitudinal axis of said yoke;

each coil winding having active conductor volumes comprising a plurality of wire conductors on each side of said winding, disposed generally longitudinally between a front and a rear of said winding and circumferentially about said central longitudinal axis, and having front and rear end conductors disposed transversely of said winding connecting said wire conductors of said active conductor volume;

the conductors of said coil windings being a greater distance from said central longitudinal axis at the front of said windings than at the rear and being generally shaped between rear and front to conform to the cylindrical neck and the bulb portions of said tube;

each of said coil windings having a window area defined between said active conductor volumes and the front and rear end conductors;

each active conductor volume having an inner edge at said window area and an outer edge spaced away from said window area with the inner edges of said active conductor volumes being spaced from one another so that the angle defined by said inner edges and the central longitudinal axis in each transverse section of said yoke decreases from rear to front of said yoke; and each active conductor volume having a distribution of said wire conductors such that at the rear of the winding the wire conductor are concentrated toward the outer edge and the distribution is shifted progressively toward a uniform distribution of said wire conductors between said inner and outer edges at the front of said winding, with the greatest change in distribution occuring near the front of said winding.

2. An electromagnetic deflection yoke for a cathode ray tube, said tube having a generally cylindrical neck portion and a flared bulk portion, comprising in combination:

a plurality of pairs of coil windings disposed about a central longitudinal axis of said yoke;

each coil winding having active conductor volumes comprising a plurality of wire conductors on each side of said winding disposed generally longitudinally to said axis between a front and a rear of said winding, and having front and rear end conductors disposed transversely of said winding connecting said wire conductors of said active conductor volume;

each active conductor volume being spaced circumferentially about said axis and having an inner edge and an outer edge;

the inner edges of each of said active conductor volumes defining a window area and said inner edges being spaced from one another in such a manner that the angles defined by said inner edges and said central longitudinal axis in respective transverse sections of said yoke decrease from the rear to the front sections of said yoke; and each conductor volume having a distribution of said wire conductors such that near the rear of the winding the wire conductors are concentrated toward the outer edge with the distribution shifted progressively toward a uniform distribution of said wire conductors between said inner and outer edges at the front of said winding, whereby the field pattern transverse of the entrance and exit regions of said yoke are barrel-shaped and the field pattern transverse of the main deflection region of said yoke is pincushion-shaped, with the total barrel-shaping and pincushion-shaping of the transverse field patterns being substantially equal to minimize coma distortion, with the greatest change in distribution occurring near the front of said winding, whereby the barrel-shaping of the transverse field pattern at the exit region of the yoke is effective to minimize astigmatic distortion.

3. An electromagnetic deflection yoke for a cathode ray tube having a generally cylindrical neck portion and a flared bulb portion, comprising in combination:

a plurality of pairs of coil windings disposed circumferentially about a central longitudinal axis of said yoke;

each winding having active conductor volumes comprising a pair of wire conductors on each side of said winding disposed generally longitudinally between the front and rear of said winding, and having front and rear end conductors disposed transversely of said winding connecting said wire conductors of said active conductor volume;

said coil windings being generally shaped between rear and front to conform to the cylindrical neck and the bulb of said tube and having a window area defined between said active conductor volumes and the front and rear end conductors with each active conductor volume having an inner edge at said window area and an outer edge spaced away from said window area;

the inner edges of each of said active conductor volumes being spaced from one another so that the angles defined by said inner edges and said central longitudinal axis in respective transverse sections of said yoke decrease from the rear to the front sections of said yoke; and each active conductor volume having a wire conductor distribution such that at the rear of the winding the wire conductors are concentrated toward the outer edge and with said distribution shifted progressively toward a uniform distribution between said inner and outer edge at the front of said winding, whereby the field pattern transverse of the entrance and exit regions of said yoke are barrel-shaped and the field pattern transverse of the main deflection region of said yoke is pincushioned-shaped, with the total barrel-shaping and pincushion-shaping of the transverse field patterns being substantially equal to minimize coma distortion, with the greatest change in distribution occurring near the front of said winding, whereby the barrel-shaping of the transverse field pattern at the exit region of the yoke is effective to minimize astigmatic distortion.

4. A deflection yoke coil for a cathode ray tube comprising:

a pair of active conductor volumes, each having a plurality of conductors, extending longitudinally of a longitudinal axis, and each having two end turn sections extending transversely of said axis and having end conductors connecting the conductors of said active conductor volume at the front and rear of said coil;

each active conductor volume having an inner surface and an outer surface, said surfaces being circumferentially disposed about said axis;

said inner surface being defined by an arc of a first circle, the radius of which changes along the length of said longitudinal axis and the center of which lies on a plane passing through said longitudinal axis and from which said active conductor volumes are equidistant and on opposite sides of said plane;

said outer surface being defined by an arc of a second circle, the radius of which changes along the length of said longitudinal axis, and the center of which is spaced at different distances from said axis along the length thereof; and each active conductor volume also having inner and outer edges with the inner edges of the pair of active conductor volumes adjacent one another to form a window area between the inner edges and the end conductors, with the inner edges being spaced away from each other so that the angle defined by said inner edges and said longitudinal axis is smaller in a transverse section at the front of said coil than in a transverse section at the rear thereof.

5. A deflection yoke coil winding for a cathode ray tube comprising:

an active conductor volume having a plurality of conductors extending longitudinally of a longitudinal axis and two end turn sections at the extremities of said winding extending transversely of said axis and having end conductors connecting the conductors of said active conductor volume;

said active conductor volume having an inner surface and an outer surface, said surfaces being circumferentially disposed about said axis;

said inner surface being defined by an arc of a first circle, the radius of which changes along the length of said longitudinal axis and the center of which lies on a plane passing through said longitudinal axis and from which said active conductor volumes are equidistant and on opposite sides of said plane;

said outer surface being defined by an arc of a second circle, the radius of which changes along the length of said longitudinal axis, and the center of which is spaced from said longitudinal axis at one extremity of said winding and which center progressively approaches said axis at the other extremity of said winding; and said active conductor volume also having inner and outer edges with a window area being formed between said end conductors, said inner edges being spaced from one another in such a manner that the angle defined by said inner edges and said central longitudinal axis in a transverse section at the front of said coil is smaller than the angle defined by said inner edges and said central longitudinal axis in a transverse section at the rear of said coil.

References Cited by the Examiner

UNITED STATES PATENTS

| | | | |
|---|---|---|---|
| 2,562,395 | 7/1951 | Schlesinger | 313—76 |
| 2,570,425 | 10/1951 | Bocciarelli | 313—76 |
| 2,821,671 | 1/1958 | Kratez et al. | 317—200 |
| 2,824,267 | 2/1958 | Barkow | 317—200 |

JOHN W. HUCKERT, *Primary Examiner.*

JAMES D. KALLAM, DAVID J. GALVIN, *Examiners.*